United States Patent
Bray et al.

(10) Patent No.: US 12,375,185 B2
(45) Date of Patent: Jul. 29, 2025

(54) NETWORK AND METHOD FOR OPTICAL COMMUNICATION WITH POLARISED LIGHT SIGNAL

(71) Applicant: BAE SYSTEMS plc, London (GB)

(72) Inventors: Mark Edgar Bray, Chelmsford (GB); Andrew James Williams, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 67 days.

(21) Appl. No.: 17/754,583

(22) PCT Filed: Sep. 28, 2020

(86) PCT No.: PCT/GB2020/052340
§ 371 (c)(1),
(2) Date: Apr. 6, 2022

(87) PCT Pub. No.: WO2021/069864
PCT Pub. Date: Apr. 15, 2021

(65) Prior Publication Data
US 2023/0344524 A1 Oct. 26, 2023

(30) Foreign Application Priority Data

Oct. 9, 2019 (GB) .................................. 1914603
Oct. 17, 2019 (EP) .................................. 19275101

(51) Int. Cl.
*H04B 10/80* (2013.01)
*H04J 14/06* (2006.01)

(52) U.S. Cl.
CPC .............. *H04B 10/80* (2013.01); *H04J 14/06* (2013.01)

(58) Field of Classification Search
CPC .................................. H04B 10/80; H04J 14/06
See application file for complete search history.

(56) References Cited

U.S. PATENT DOCUMENTS 5,739,943 A * 4/1998 Ohshima ............... G02F 1/0311
359/489.07
8,305,504 B2 * 11/2012 Shen ...................... G02F 1/0136
349/96

(Continued)

FOREIGN PATENT DOCUMENTS

WO 2021069864 A1 4/2021

OTHER PUBLICATIONS

International Search Report and Written Opinion received for PCT/GB2020/052340, dated Dec. 15, 2020. 15 pages.

(Continued)

*Primary Examiner* — Pranesh K Barua
(74) *Attorney, Agent, or Firm* — Finch & Maloney PLLC

(57) ABSTRACT

A network, or part thereof for example a link, 1 is described. The network 1 is for data communication through a medium, preferably wherein the medium comprises and/or is, at least in part, a liquid medium LM. The network 1 comprises a set of transmitters 11, including a first transmitter 11A comprising a controller 110A, wherein the first transmitter 11A is configured to transmit a set of polarised optical signals S, including a first polarised optical signal S1 comprising first data D1 of set of data D. The network 1 comprises a set of receivers 12, including a first receiver 12A comprising a controller 120A, wherein the first receiver 12A is configured to receive the first polarised optical signal S1.

21 Claims, 5 Drawing Sheets

(56) References Cited

U.S. PATENT DOCUMENTS

| | | | |
|---|---|---|---|
| 8,953,647 B1 | 2/2015 | Mead et al. | |
| 9,490,911 B2* | 11/2016 | Hopewell | H04B 10/50 |
| 2015/0219765 A1* | 8/2015 | Mead | H01S 3/1616 |
| | | | 356/5.09 |
| 2016/0127042 A1* | 5/2016 | Farr | H04B 10/11 |
| | | | 398/104 |
| 2017/0257173 A1* | 9/2017 | Harris | H04B 10/07953 |
| 2019/0305847 A1* | 10/2019 | Sharp | H04B 17/327 |
| 2022/0166509 A1* | 5/2022 | Civanlar | H04B 13/02 |

OTHER PUBLICATIONS

Extended European Search Report received for EP Application No. 19275101.4, dated Mar. 19, 2020. 11 pages.
GB Search Report under Section 17(5) received for GB Application No. 1914603.4, dated Jun. 12, 2020. 4 pages.
GB Search Report received for GB Application No. 1914603.4, 1 page.
Cox, et al., "A Polarization Shift-Keying System for Underwater Optical Communications," IEEE, (Oct. 26, 2009), pp. 1-4.
Saeed, et al., "Underwater optical wireless communications, networking, and localization: A survey," Elsevier, Ad Hoc Networks vol. 94 (Jun. 27, 2019) 101935. pp. 1-35.
Von der Weid, J.P. and da Silva, J.A.P., "Underwater Cableless Data Transmission," IEEE, vol. 3 (Oct. 18, 1993), pp. 191-193.
International Preliminary Report on Patentability received for PCT Application No. PCT/GB2020/052340. Mail date: Apr. 21, 2022. 9 pages.

* cited by examiner

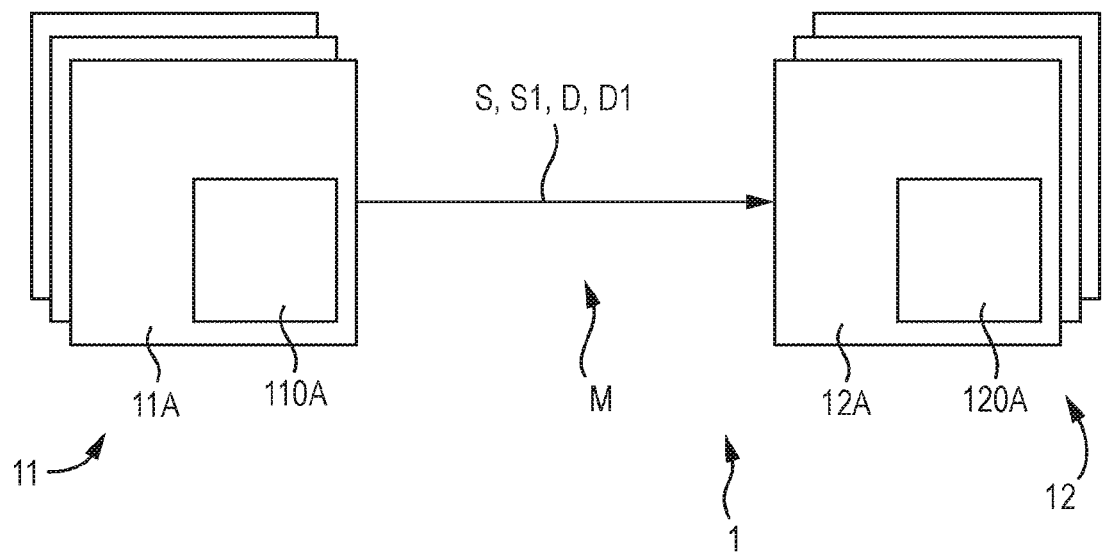
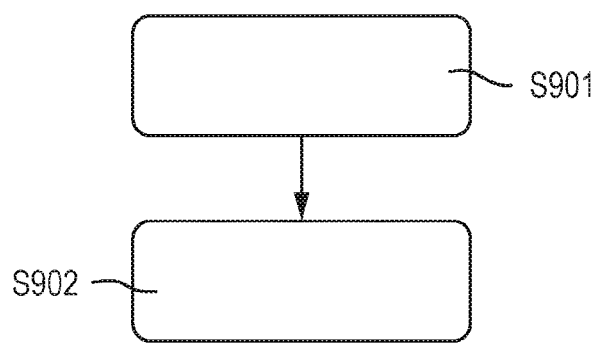

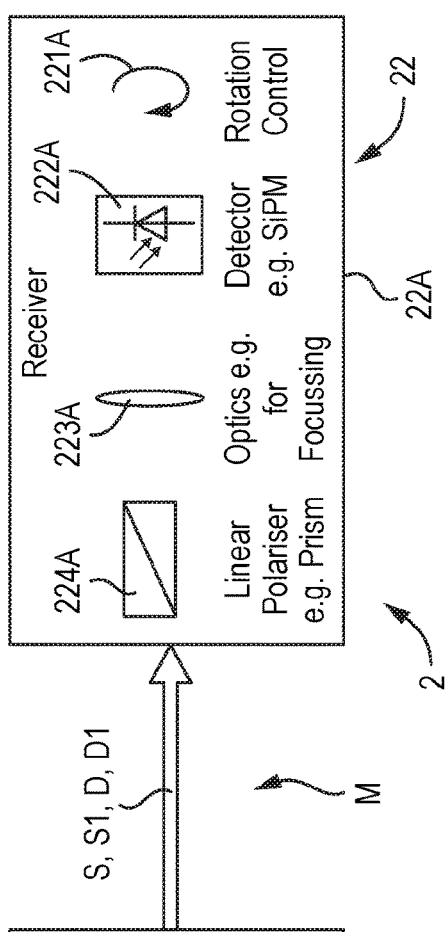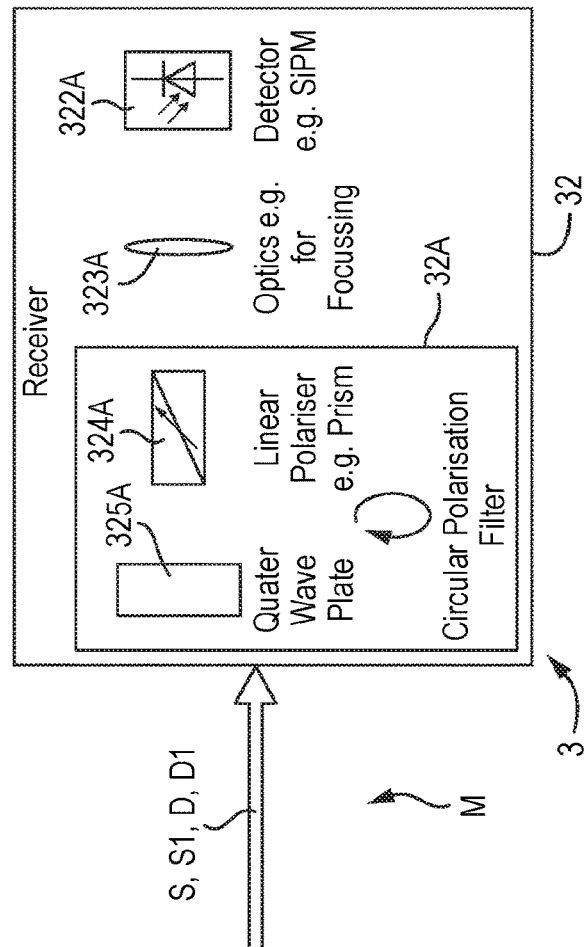

NETWORK AND METHOD FOR OPTICAL COMMUNICATION WITH POLARISED LIGHT SIGNAL

FIELD

The present invention relates to data communication through a medium, preferably wherein the medium comprises and/or is, at least in part, a liquid medium using optical signals.

BACKGROUND TO THE INVENTION

Current research into data communication for maritime applications is directed towards 'free-space' optical communication, including fully through water such as from a submarine to an unmanned submersed vessel (FIG. 1) and through water and air/space in either direction, such as between a plane/satellite and a submarine (FIG. 2). Submarines are examples of submersible water craft including manned submarines, unmanned submarine, divers and tethered buoys.

Generally, free-space optical (FSO) communication is an optical communication technology that uses light propagating in free space to wirelessly transmit data for telecommunications or computer networking, for example. Free space means air, outer space, vacuum, or something similar (i.e. a gas medium or vacuum). This contrasts with using solids such as optical fibre cable. As described herein, the optical communication is analogous to FSO communication but the medium may comprise, at least in part, a liquid medium, for example water such as sea water.

Known optical sources for optical communications for maritime applications include light emitting diodes (LEDs) and lasers. However, a liquid medium may be highly scattering (i.e. of a transmitted optical signal), so received power is normally very low, typically requiring a receiver to include an optical gain device or amplifier, such as a silicon photomultiplier (PM) or a PM tube. In addition, LEDs transmit light over a relatively wide cone of angles, such that received power is further reduced. While lasers may be collimated to transmit light over a relatively narrow cone of angles, directing the transmitted light to be incident on the receiver is relatively complex, such as requiring a bank or an array of transmitters oriented in different directions. Thus, the signal to noise at the receiver is generally relatively low, due at least in part to the highly scattering liquid medium, the cone angle of the transmitted light and/or incidence of the transmitted light onto the receiver.

Hence, there is a need to improve data communication through a medium, preferably wherein the medium comprises and/or is, at least in part, a liquid medium using optical signals.

SUMMARY OF THE INVENTION

It is one aim of the present invention, amongst others, to provide a network, or part thereof for example a link, for and a method of data communication through a medium, preferably wherein the medium comprises and/or is, at least in part, a liquid medium using optical signals which at least partially obviates or mitigates at least some of the disadvantages of the prior art, whether identified herein or elsewhere. For instance, it is an aim of embodiments of the invention to provide such a network, or part thereof for example a link, and such a method that increases a received signal to noise ratio, thereby improving transmission reliability and/or enabling a higher data rate, for example. For instance, it is an aim of embodiments of the invention to provide such a network, or part thereof for example a link, and such a method that provides a received signal to noise ratio comparable to that achieved conventionally but at a relatively lower transmitting power, thereby improving electrical power consumption and/or covertness, for example. For instance, it is an aim of embodiments of the invention to provide such a network, or part thereof for example a link, and such a method that transmits at a power comparable to that used conventionally, thereby increasing a transmission range for a given received signal to noise ratio.

A first aspect provides a network, or part thereof for example a link, for data communication through a medium, preferably wherein the medium comprises and/or is, at least in part, a liquid medium, wherein the network comprises:
  a set of transmitters, including a first transmitter comprising a controller, wherein the first transmitter is configured to transmit a set of polarised optical signals, including a first polarised optical signal comprising first data of set of data; and
  a set of receivers, including a first receiver comprising a controller, wherein the first receiver is configured to receive the first polarised optical signal.

A second aspect provides a method of communication of data through a medium, preferably wherein the medium comprises and/or is, at least in part, a liquid medium, wherein the method comprises:
  transmitting, by first transmitter included in a set of transmitters, a set of polarised optical signals, including a first polarised optical signal comprising first data of set of data; and
  receiving, by a first receiver included in a set of receivers, the first polarised optical signal.

DETAILED DESCRIPTION OF THE INVENTION

According to the present invention there is provided a network, or part thereof for example a link, for data communication through a medium, preferably wherein the medium comprises and/or is, at least in part, a liquid medium using optical signals, as set forth in the appended claims. Also provided is a method of communication of data through a medium, preferably wherein the medium comprises and/or is, at least in part, a liquid medium using optical signals. Other features of the invention will be apparent from the dependent claims, and the description that follows.

The first aspect provides a network, or part thereof for example a link, for data communication through a medium, preferably wherein the medium comprises and/or is, at least in part, a liquid medium, wherein the network comprises:
  a set of transmitters, including a first transmitter comprising a controller, wherein the first transmitter is configured to transmit a set of polarised optical signals, including a first polarised optical signal comprising first data of set of data; and
  a set of receivers, including a first receiver comprising a controller, wherein the first receiver is configured to receive the first polarised optical signal.

In this way, since the first receiver is configured to receiver the first polarised optical signal transmitted by the first transmitter, a received signal to noise ratio is increased, compared with transmitting and/or receiving non-polarised optical signals, for a given transmitting power, medium and range. Furthermore, in this way, an intensity of the first polarised optical signal observable from above a surface of the liquid medium, for example, may be reduced, as described below in more detail, improving covertness.

Particularly, background light (i.e. a contributor to the noise) may be partially polarised, so relatively less background light will be received by the first receiver, which is configured to receive the first polarised optical signal. In contrast, substantially all and/or all of the first polarised optical signal incident on the first receiver is received thereby, since the first receiver is configured to receive the first polarised optical signal. Polarisation of the background light may depend on location (e.g. latitude, longitude, depth and/or altitude) and/or the position of the sun. If there is a relatively low degree of polarisation of the background light, about half of the background light may be rejected by the first receiver, which is configured to receive the first polarised optical signal. If there is a relatively high degree of polarisation of the background light, most of the background light may be rejected by the first receiver, which is configured to receive the first polarised optical signal, subject to appropriate polarisation of the first polarised optical signal.

The polarisation of the background light will depend on location (latitude, longitude depth and attitude), and position of the sun. This could be used to mutually control the orientation of the source polarisation and the polarising filter to maximum advantage. For example, the orientation and degree of polarisation underwater will depend on the solar zenith angle and the viewing angle. With the above knowledge (e.g. from known location, time of day, date, depth) the orientation and degree of polarisation can be estimated from a model. This could be used advantageously by setting polarisation orientation for optimum background rejection. In one example, the controller of the first transmitter is configured to control an orientation of polarisation of the first polarised optical signal and/or wherein the controller of the first receiver is configured to control an orientation, for example a corresponding orientation, of a set of polarising filters, including a first polarising filter.

In this way, by increasing the received signal to noise ratio, transmission reliability may be improved and/or a higher data rate enabled, for example. In this way, the received signal to noise ratio may be comparable to that achieved conventionally but at a relatively lower transmitting power, thereby improving electrical power consumption and/or covertness, for example. In this way, a transmitted power may be comparable to that used conventionally, providing an increased transmission range for a given received signal to noise ratio.

Additionally and/or alternatively, covertness may be improved because a hostile observer would require a hostile receiver also configured to receive the set of polarised optical signals, including the first polarised optical signal comprising first data of set of data. If the hostile receiver is configured to receive optical signals having all polarisations, a signal to noise ratio of such a hostile receiver will be relatively poor due to receiving also background light, for example, such that the first polarised optical signal is not discernible therefrom.

Conventional approaches to providing an acceptable signal to noise at a receiver in the presence of a high loss medium include:
1. Increasing a transmission power of unpolarised optical signals, such as from a light emitting diode (LED), which requires additional electrical power providing additional problems for divers and/or unmanned units, for example, where power may be limited, while increasing the transmission power increases the power of scattered light, such as through the water surface, which may be detected by a hostile observer and is thus undesirable;
2. Using a laser instead of an LED to provide more intensity via a collimated beam but which leads to the issues regarding directing the laser, as described previously;
3. Reducing a bandwidth of the transmission, thereby reducing the power signal to noise ratio require, but this may be undesirable for operational reasons. For example, if duration of transmission of a bit of data lasts for a second, the energy (signal) is Power×1 while if the duration lasts fora millisecond, the energy is Power/1000. It is easier to detect the former energy with a 1 Bit/s bandwidth than the latter energy with a 1000 Bit/s bandwidth. The operational reasons may constrain which bandwidths are allowed however e.g. if live video needs to be streamed as compared to a single voice channel. Ultimately, the signal to noise ratio normally increases as the square root of the measurement time, all other things being equal;
4. Limiting a range of operation to mitigate transmission losses, but this may be undesirable for operational reasons.

In contrast, the network according to the first aspect manipulates or controls a physical light property, namely polarisation, in order to improve the optical signal to noise ratio.

Network

The network is for data communication i.e. a data communication network comprising the set of transmitters and the set of transmitters, for example a 1:1 network, a 1:N network or a M:N network, as understood by the skilled person. In this way, the first data of the set of data is transmitted from the first transmitter and received by the first receiver. In one example, the data communication comprises and/or is unidirectional communication, for example from the first transmitter to the first receiver or from the first transmitter to only the first receiver. Unidirectional communication may be for transmitting of control instructions, such as from a submarine to a buoy, and/or for transmitting of sensed measurements, such as from a buoy to a submarine, for example. If the data communication is from the first transmitter to only the first receiver, the data communication is restricted therebetween, for example using specific polarisation of the first polarised optical signal and/or directional communication, as described below in more detail. In one example, the data communication comprises and/or is bidirectional communication, for example from the first transmitter to the first receiver and vice versa or from the first transmitter to only the first receiver and vice versa. In such a case, for bidirectional communication, the first transmitter comprises and/or is a transceiver and the first receiver comprises and/or is a transceiver. Bidirectional communication may be for transmitting of instructions, such as from a submarine to a diver, and for transmitting of responses in reply, such as from the diver to the submarine, for example. In one example, the data communication comprises and/or is broadcasting, for example from the first transmitter to the set of receivers including the first receiver. In this way, the first data of set of data may be communicated to the set of receivers, for example including a plurality of receivers, for example simultaneously. In one example, the data communication comprises and/or is transmitting the first polarised optical signal comprising the first data of the set of data from the first transmitter to the first receiver of the set of receivers and transmitting a second polarised optical signal comprising second data of the set of data from the first transmitter to a second receiver of the set of receivers. In this way, different data are transmitted to different receivers, for example on separate channels e.g. orthogonal polarisations or different wavelengths.

Medium

The data communication is through a medium, preferably wherein the medium comprises and/or is, at least in part, a liquid medium.

In one example, the medium comprises a vacuum (for example space), a gas (for example air) and/or a liquid (for example water such as sea water).

In one example, the liquid medium is water, for example sea water. Sea water may be classified typically into four types, which have different light scattering properties:
1. Pure sea waters, in which absorption is the main limiting factor but in which a beam propagates approximately in a straight line;
2. Clear ocean waters; having higher concentrations of dissolved particles that affect scattering;
3. Coastal ocean waters, having a much higher concentration of planktonic matters, detritus and mineral components that affect absorption and scattering; and
4. Turbid harbour and estuary waters, having very high concentrations of dissolved and in-suspension matters.

In one example, the data communication is through only the liquid medium, for example between a submersed first transmitter and a submersed first receiver, such as between a submarine and a diver or a buoy. In one example, the data communication is through the liquid medium and through a gas medium, for example between a submersed first transmitter and a surface or air first receiver, such as between a submarine and an aircraft. In one example, the data communication is through the liquid medium, through a gas medium and through a vacuum, for example between a submersed first transmitter and a space first receiver, such as between a submarine and a satellite.

Absorption and Scattering

The two main processes affecting light propagation in water are absorption and scattering, which both depend on wavelength A of the light (i.e. of the first polarised optical signal). Absorption is the irreversible loss of intensity and depends on the water's index of refraction (i.e. the complex part). The spectral absorption coefficient $a(\lambda)$ is the main intrinsic optical property (IOP) to model water absorption. Scattering, on the other hand, refers to the deflection of light from the original path, which can be caused by particles of size comparable to the wavelength $\lambda$ (diffraction), or by particulate matters with refraction index different from that of the water (refraction). The spectral volume scattering function (VSF) $\beta(\Psi,\lambda)$ is defined as the fraction of the incident power scattered out of the beam through an angle $\Psi$ within a solid angle $\Delta\Omega$ centred on $\Psi$. The VSF is used as the main IOP to model scattering in water. Integrating the VSF over all directions gives the scattering coefficient $b(\lambda)$:

$b(\lambda)=2\pi\int_0^\pi\beta(\Psi,\lambda)\sin(\Psi)d\Psi$

The extinction coefficient c is defined as:

$c(\lambda)=a(\lambda)+b(\lambda)$

Note that a, b, and c have units of $m^{-1}$.

In addition to water molecules, different particles in solution and/or in suspension in water affect absorption and scattering. The spectral absorption and scattering coefficients a and b can be calculated by adding the contribution of each class of particles to the corresponding coefficients of the pure sea water. In particular, phytoplanktons determine the optical properties of most oceanic waters because their chlorophyll and related pigments strongly absorb light in the blue and red spectral ranges.

TABLE 1

Typical coefficients for different types of sea water, which may be wavelength dependent.

| Water type | C (mg/m³) | a/m⁻¹ | b/m⁻¹ | c/m⁻¹ |
| --- | --- | --- | --- | --- |
| Pure sea | 0.005 | 0.053 | 0.003 | 0.056 |
| Clear ocean | 0.31 | 0.069 | 0.08 | 0.15 |
| Coastal | 0.83 | 0.088 | 0.216 | 0.305 |
| Harbour | 5.9 | 0.295 | 1.875 | 2.17 |

C is the concentration of chlorophyll.

Transmitters

The network comprises the set of transmitters, including the first transmitter comprising a controller.

In one example, the set of transmitters includes M transmitters, including the first transmitter, wherein M is a natural number greater than or equal to 1, for example 1, 2, 3, 4, 5, 6, 7, 8, 9, or more.

It should be understood that the controller of the first transmitter is arranged to control the first transmitter, for example to control the first transmitter to transmit the set of polarised optical signals, including the first polarised optical signal comprising the first data of set of data. In one example, the controller comprises a processor and a memory, including instructions which when executed by the processor, control the first transmitter, for example as described below.

The first transmitter is configured to transmit the set of polarised optical signals, including the first polarised optical signal comprising the first data of set of data. That is, the first transmitter comprises and/or is an optical transmitter.

In one example, the controller of the first transmitter is configured to control a type of polarisation of the first polarised optical signal. Types of polarisation include linear polarisation and circular polarisation. The general polarisation state is elliptical, with several degenerate states (linearly (horizontal, vertical), linear +−45 deg), and circular (right handed and left handed).

In one example, the set of polarised optical signals includes P polarised optical signals, including the first polarised optical signal, wherein P is a natural number greater than or equal to 1, for example 1, 2, 3, 4, 5, 6, 7, 8, 9, 10 or more. The P polarised optical signals may have different types of polarisation, for example linear polarisation or circular polarisation.

Additionally and/or alternatively, polarised optical signals having linear polarisation may have different polarisation planes, as described below. In this way, the first transmitter may transmit different polarised optical signals for different receivers of the set of receivers.

Linear Polarisation

In one example, the first polarised optical signal comprises and/or is a linearly-polarised optical signal.

Linear polarisation allows the electric field to oscillate in only one plane perpendicular to the direction of travel of the wave, as shown in FIG. 3. There are many optical elements that can be used to polarise light into a linear polarisation such as a Glan-Thompson prism. Additionally and/or alternatively, the output from some lasers may be inherently polarised. Similar elements can be used at the receiving end to act as a linear polarisation filter (i.e. a first polarising filter, as described below). For linear polarisation, the polarisation planes of the transmitted light (i.e. the first polarised optical signal) and the receiving filter need to be aligned or light is lost, for example in varying proportions according to the relative angle e.g. at 90°, zero light is received. The power relationship is $P=P_0 \cos^2 \theta$. This alignment may be achieved by referring the plane directions to the local vector of gravity, for example, as described below.

An advantage of using linearly polarised light is that if the polarisation is aligned correctly, a fraction of light transmitted by the first transmitter and reflected within the liquid at the surface of the liquid medium, for example by surface of the sea, will be increased. This will reduce the amount of light reaching a hostile observer above the water, again increasing covertness.

In more detail, when light encounters a boundary between two media having different refractive indices, some of the light is usually reflected by the boundary. The fraction of light that is reflected is described by the Fresnel equations, and is dependent upon the incoming light's polarization and angle of incidence.

The Fresnel equations predict that light with orthogonal polarisations will be reflected by different amounts upon transitioning through the water/air interface (FIG. 9). By selecting the polarisation to maximise the internal reflection, the light exiting the surface and visible to observers will be reduced improving covertness, and the light reflected will be increased. This increased reflection may increase the signal to noise ratio of the communications link. However this benefit is only a few percentage points.

In one example, the controller of the first transmitter is configured to control an angle of polarisation of the first polarised optical signal. In this way, the angle of polarisation of the first polarised optical signal, for example wherein the first polarised optical signal comprises and/or is a linearly-polarised optical signal, may be selected.

In one example, the controller of the first transmitter is configured to control an alignment of the first polarised optical signal, preferably wherein the first polarised optical signal comprises and/or is a linearly-polarised optical signal, for example based, at least in part, on a gravitational field such as a local gravitational field, local magnetic field and/or gyroscopic control. It should be understood that the alignment refers to an angle or an orientation with respect to a datum, such as the local gravitational field, local magnetic field and/or the gyroscopic reference. In this way, transmission of the first polarised optical signal from the first transmitter to the first receiver may be maintained, for example, during relative movement of the first transmitter and the first receiver. In other words, polarisation alignment from the first transmitter to the first receiver may be conserved irrespective of movement of the first transmitter and/or the first receiver.

In one example, the controller of the first transmitter is configured to control an alignment of the first polarised optical signal, preferably wherein the first polarised optical signal comprises and/or is a linearly-polarised optical signal, according to an angle of the first polarised optical signal relative to a surface of the liquid medium. In this way, transmission of the first polarised optical signal through the surface of the liquid medium may be reduced, thereby decreasing a probability of detection of the first polarised optical signal by an observer above the surface of the liquid medium, for example, such as above the surface of an ocean.

In one example, the controller of the first receiver is configured to control a dither, for example a dithering angle, of the first polarised optical signal, preferably wherein the first polarised optical signal comprises and/or is a linearly-polarised optical signal. The dither allows angle tracking—if the signal received is worse on one side of the dither than on the other side of the dither, controller controls the centre of the dither to move to the stronger side. In this way, alignment of the first receiver with respect to the first polarised optical signal is improved, thereby increasing an intensity of the received signal first polarised optical signal. In one example, the dithering angle is changed according to alignment of the first receiver with respect to the first polarised optical signal, for example reduced when the alignment is improved compared with increased when the alignment is poorer.

In one example, the first transmitter comprises a rotation control unit for aligning the first transmitter for example with respect to the first receiver, a light source, such as a laser or LED, optics for collimation of light from the light source and a linear polariser, such as a prism, for linear-polarisation of the collimated light. In one example, the rotation control unit is arranged to align the first transmitter by rotating the light source, the optics and/or the linear polariser about one, two or three orthogonal axes.

In this example, the first receiver comprises a linear polariser, such as a prism, for receiving the first polarised optical signal, optics for focusing the received first polarised optical signal, a detector, such as a Si PM, for detecting the focused received first polarised optical signal S1 and a rotation control unit for aligning the first receiver for example with respect to the first transmitter. In one example, the rotation control unit is arranged to align the first receiver by rotating the linear polariser, the optics and/or the detector about one, two or three orthogonal axes.

Circular Polarisation

In one example, the first polarised optical signal comprises and/or is a circularly-polarised optical signal.

The alignment problem of linear polarisations is mitigated if circular polarisation is used instead. This is generated by the superposition of two orthogonal linear waves with a phase difference of $\lambda/2$ between them. In this case the peak amplitude of the wave sweeps out a helix as it travels, as shown in FIG. 4. Circularly polarised light may be obtained by transmitting linearly polarised light at 45° to the axis of a quarter wave plate. Similarly, a quarter wave plater having a polariser at 45° may be used as a circular polarisation filter.

There are two different directions of circularly polarised light, looking along the direction of travel at peak sweeps: clockwise or anti-clockwise, as understood by the skilled person. Again the unpolarised background light will be split between these two polarisations so half will be eliminated by a polarisation filter. Hence, by using circularly polarised light, similar or the same signal to noise ratios and indirect benefits, compared with linearly polarised light, are obtained.

The advantage of the use of circularly polarised light is that the first receiver simply needs to be facing the first transmitter. That is, the first receiver does not need to be angularly aligned in the plane perpendicular to the transmission direction, which is the case for linear polarisation.

In one example, the first transmitter comprises a light source, such as a laser or LED, optics for collimation of light from the light source, a linear polariser, such as a prism, for linear-polarisation of the collimated light and a quarter wave plate. The linear polariser and the quarter wave plate provide a circular polariser.

In this example, the first receiver comprises a quarter wave plate, a linear polariser, such as a prism, for receiving the first polarised optical signal, optics for focusing the received first polarised optical signal and a detector, such as a Si PM, for detecting the focused received first polarised optical signal. The quarter wave plate and the linear polariser provide a circular polarisation filter.

Receivers

The network comprises the set of receivers, including the first receiver comprising a controller.

The first receiver is configured to receive the first polarised optical signal. It should be understood that the first receiver is not a broadband receiver but instead, is specifically arranged to receive the first polarised optical signal rather than optical signals having different or no polarisation, though may additionally receive such optical signals or a proportion thereof.

In one example, the first receiver is configured to receive only the set of polarised optical signals, including the first polarised optical signal. In one example, the first receiver is configured to receive only the set of polarised optical signals, including the first polarised optical signal, by comprising a set of polarising filters, including a first polarising filter, arranged to accept, for example transmit therethrough, the set of polarised optical signals and to reject other optical signals, such as background light, having polarisations different from the transmitted set of polarised optical signals, though may additionally receive such optical signals or a proportion thereof.

As described above, background light (i.e. a contributor to the noise) may be partially polarised, so relatively less background light will be received by the first receiver, which is configured to receive the first polarised optical signal because the first polarising filter is arranged to reject at least some of the background light. In contrast, substantially all and/or all of the first polarised optical signal incident on the first receiver is received thereby, since the first receiver is configured to receive the first polarised optical signal because the first polarising filter is arranged to accept the first polarised optical signal. If there is a relatively low degree of polarisation of the background light, about half of the background light may be rejected by the first receiver, which is configured to receive the first polarised optical signal, particularly by the first polarising filter which is arranged to reject at least some of the background light. If there is a relatively high degree of polarisation of the background light, most of the background light may be rejected by the first receiver, which is configured to receive the first polarised optical signal, particularly by the first polarising filter which is arranged to reject at least some of the background light, subject to appropriate polarisation of the first polarised optical signal and corresponding polarisation of the first polarising filter.

In one example, the controller of the first receiver is configured to control the first receiver to receive the first polarised optical signal according to a type of polarisation of the first polarised optical signal, for example wherein the first polarised optical signal comprises and/or is a linearly-polarised optical signal or a circularly-polarised signal.

In one example, the controller of the first receiver is configured to control the first receiver to receive the first polarised optical signal according to an angle of polarisation of the first polarised optical signal.

In one example, the controller of the first receiver is configured to control the first receiver, for example to control a first polarising filter thereof such as by rotation, to receive the first polarised optical signal according to an angle of polarisation thereof. In one example, an angle of polarisation of the first polarised optical signal is predetermined. In one example, an angle of polarisation of the first polarised optical signal is selectable. In one example, an angle of polarisation of the first polarised optical signal is changeable such as over time, for example according to an algorithm synchronized between the first transmitter and the first controller. In this way, a time-varying angle of polarisation reduces likelihood of eavesdropping by a hostile observer.

In one example, a wavelength of the first polarised optical signal is in a range from 380 nm to 740 nm (i.e. visible spectrum), preferably in a range from 485 nm to 590 nm (i.e. cyan to green to yellow), more preferably in a range from 500 nm to 565 nm (i.e. green). In this way, transmission of the first polarised optical signal though the liquid medium, for example water such as sea water, is improved.

In one example, the first transmitter is configured to transmit the set of polarised optical signals, including a second polarised optical signal comprising second data of the set of data, wherein polarisation of the first polarised optical signal and the second polarised optical signal are different. In this way, two sets of data may be communicated separately, for example to the first receiver or two different receivers.

In one example, the set of receivers includes a second receiver configured to receive the second polarised optical signal. In this way, two sets of data may be communicated separately, to the first receiver and to the second receiver, respectively. For example, different sets of data may be transmitted to different receivers (i.e. the first and second receivers) on separate channels e.g. orthogonal polarisations or different wavelengths. The second receiver may be as described with respect to the first receiver.

Submersible

In one example, the first transmitter comprises and/or is a submersible transmitter and/or wherein the first receiver comprises and/or is a submersible receiver. Examples of submersible transmitters and receivers include submersible watercraft such as submarines, manned submarined, unmanned submarines, autonomous submarines, buoys and diver communication units. Surface watercraft, such as boats or ships, may include submersible transmitters and receivers below the waterline, for example.

Method

The second aspect provides a method of communication of data through a medium, preferably wherein the medium comprises and/or is, at least in part, a liquid medium, wherein the method comprises:

transmitting, by a first transmitter included in a set of transmitters, a set of polarised optical signals, including a first polarised optical signal comprising first data of set of data; and receiving, by a first receiver included in a set of receivers, the first polarised optical signal.

The communication, the data, the liquid medium, the first transmitter, the set of transmitter, the set of polarised optical signals, the first polarised optical signal, the first set of data, the first receiver and/or the set of receivers may be as described with respect to the first aspect.

In one example, the method comprises controlling, by the first transmitter, a type of polarisation of the first polarised optical signal and/or an angle of polarisation of the first polarised optical signal, as described with respect to the first aspect.

In one example, the method comprises receiving, by the first receiver, the first polarised optical signal according to a type of polarisation of the first polarised optical signal and/or an angle of polarisation of the first polarised optical signal, as described with respect to the first aspect.

In one example, the liquid medium comprises and/or is sea water, as described with respect to the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIG. 5 schematically depicts a network, or part thereof for example a link, according to an exemplary embodiment;

FIG. 6 schematically depicts a network, or part thereof for example a link, according to an exemplary embodiment;

FIG. 7 schematically depicts a network, or part thereof for example a link, according to an exemplary embodiment;

FIG. 8 schematically depicts a method according to an exemplary embodiment; and

DETAILED DESCRIPTION OF THE DRAWINGS

Figure 1:
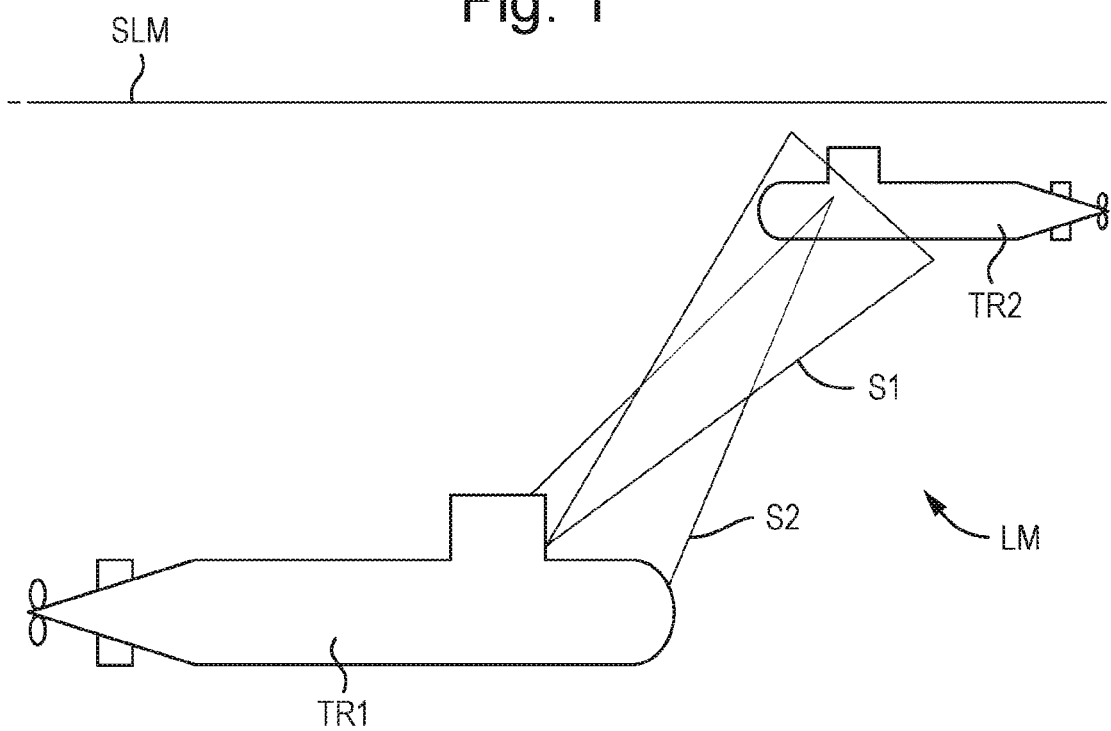
FIG. 1 schematically depicts conventional transmission of optical signals fully through water.

FIG. 1 schematically depicts conventional transmission of optical signals fully through water.

In more detail, a first submersible transceiver TR1, particularly a first submarine, is in communication with a second submersible transceiver TR2, particularly a second submarine, using optical signals through a liquid medium LM, particularly sea water. The first submersible transceiver TR1 and the second submersible transceiver TR2 are below a surface SLM of the liquid medium LM. Optical signal S1 is transmitted by the first submersible transceiver TR1 and received by the second submersible transceiver TR2. Optical signal S2 is transmitted by the second submersible transceiver TR2 and received by the first submersible transceiver TR1. However, as described above, a signal to noise ratio of the received optical signals S1, S2 is relatively low.

Figure 2:
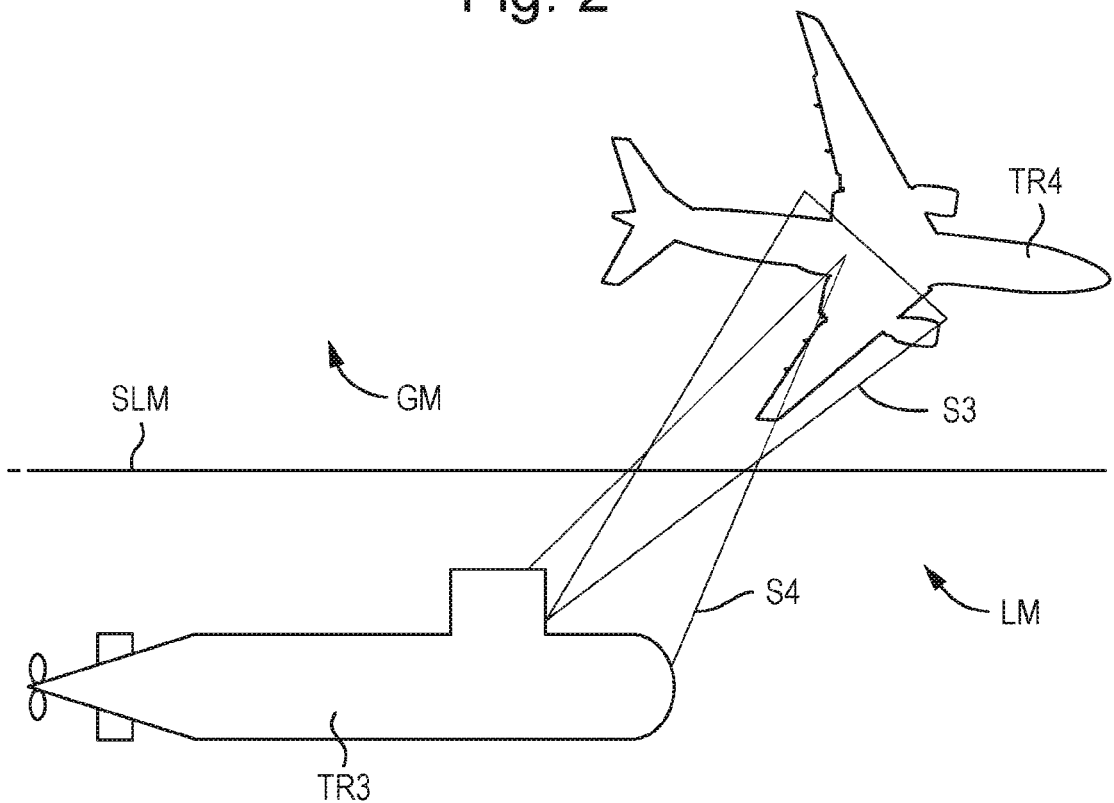
FIG. 2 schematically depicts conventional transmission of optical signals through water and air and vice versa.

FIG. 2 schematically depicts conventional transmission of optical signals through water and air and vice versa.

In more detail, a third submersible transceiver TR3, particularly a third submarine, is in communication with a fourth non-submersible transceiver TR4, particularly a first aircraft, using optical signals partly through a liquid medium LM, particularly sea water, and partly through a gas medium GM, particularly air. The third submersible transceiver TR1 is below a surface SLM of the liquid medium LM while the fourth non-submersible transceiver is above the surface SLM of the liquid medium LM. Optical signal S3 is transmitted by the third submersible transceiver TR3 and received by the fourth non-submersible transceiver TR4. Optical signal S4 is transmitted by the fourth non-submersible transceiver TR4 and received by the third submersible transceiver TR3 However, as described above, a signal to noise ratio of the received optical signals S3, S4 is relatively low.

Figure 3:
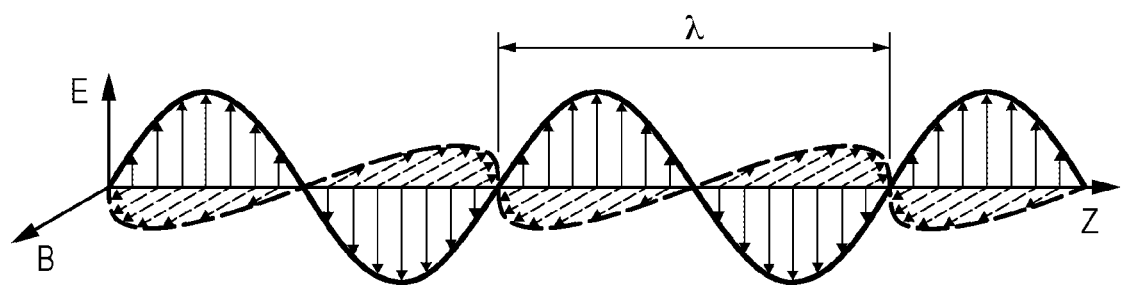
FIG. 3 schematically depicts a linearly-polarised wave, in which vectors on the vertical axis (E) represent e-field.

FIG. 3 schematically depicts a linearly-polarised wave, in which vectors on the vertical axis (E) represent e-field.

Figure 4:
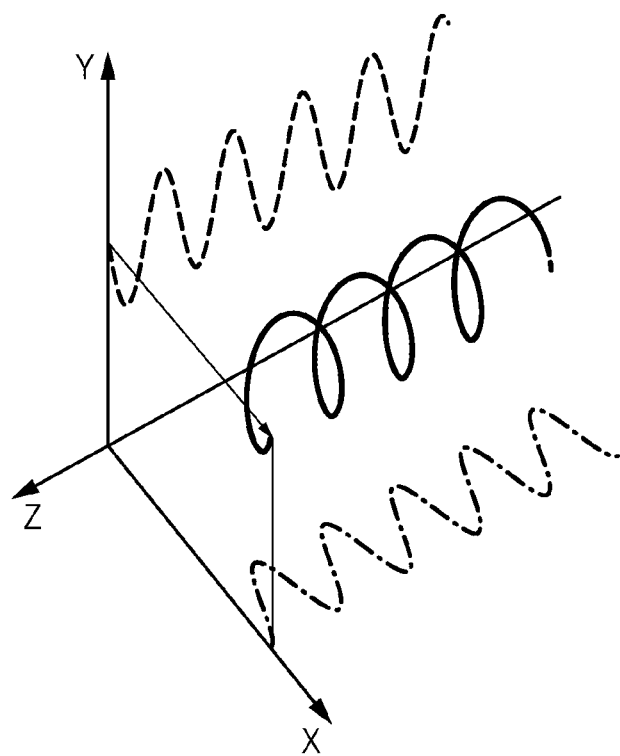
FIG. 4 schematically depicts a circularly-polarised wave, in which the helical line represents e-field.
Figure 9:
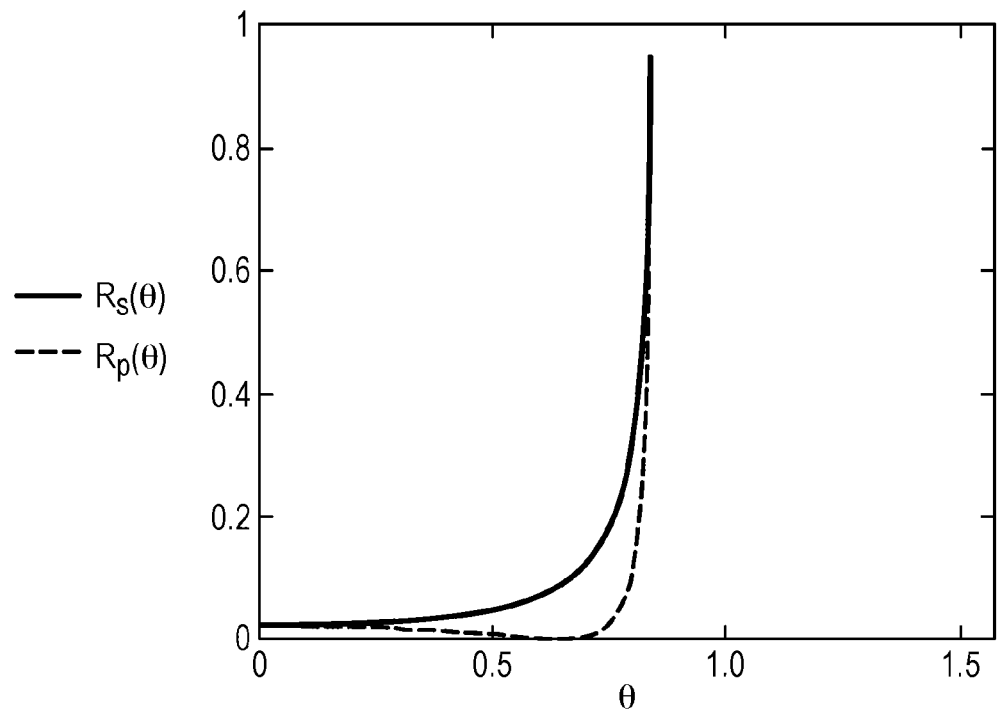
FIG. 9 is a graph, together with associated equations, predicting that light with orthogonal polarisations will be reflected by different amounts upon transitioning through the water/air interface.

FIG. 4 schematically depicts a circularly-polarised wave, in which helical vectors represent e-field.

FIG. 5 schematically depicts a network, or part thereof for example a link, 1 according to an exemplary embodiment.

The network 1 is for data communication through a medium M, preferably wherein the medium M comprises and/or is, at least in part, a liquid medium LM. The network 1 comprises a set of transmitters 11, including a first transmitter 11A comprising a controller 110A, wherein the first transmitter 11A is configured to transmit a set of polarised optical signals S, including a first polarised optical signal S1 comprising first data D1 of set of data D. The network 1 comprises a set of receivers 12, including a first receiver 12A comprising a controller 120A, wherein the first receiver 12A is configured to receive the first polarised optical signal S1.

FIG. 6 schematically depicts a network, or part thereof for example a link, 2 according to an exemplary embodiment.

The network 2 is for data communication through a medium M, preferably wherein the medium M comprises and/or is, at least in part, a liquid medium LM. The network 2 comprises a set of transmitters 21, including a first transmitter 21A comprising a controller 210A (not shown), wherein the first transmitter 21A is configured to transmit a set of polarised optical signals S, including a first polarised optical signal S1 comprising first data D1 of set of data D. The network 2 comprises a set of receivers 22, including a first receiver 22A comprising a controller 220A (not shown), wherein the first receiver 22A is configured to receive the first polarised optical signal S1.

In this example, the first transmitter 21A comprises a rotation control unit 211A for aligning the first transmitter 21A for example with respect to the first receiver 22Ar, a light source 212A, such as a laser or LED, optics 213A for collimation of light from the light source 212A and a linear polariser 214A, such as a prism, for linear-polarisation of the collimated light. In this example, the rotation control unit 211A is arranged to align the first transmitter 21A by rotating the light source 212A, the optics 213A and/or the linear polariser 214A about one, two or three orthogonal axes.

In this example, the first receiver 22A comprises a linear polariser 224A, such as a prism, for receiving the first polarised optical signal S1, optics 223A for focusing the received first polarised optical signal S1, a detector 222A, such as a Si PM, for detecting the focused received first polarised optical signal S1 and a rotation control unit 221A for aligning the first receiver 22A for example with respect to the first transmitter 21A. In this example, the rotation control unit 221A is arranged to align the first receiver 22A by rotating the linear polariser 224A, the optics 223A and/or the detector 222A about one, two or three orthogonal axes.

In this example, the controller of the first transmitter 21A is configured to control a type of polarisation of the first polarised optical signal S1, particularly linear polarisation and circular polarisation.

In this example, the first polarised optical signal S1 is a linearly-polarised optical signal.

In this example, the controller of the first transmitter 21A is configured to control an angle of polarisation of the first polarised optical signal S1.

In this example, the controller of the first transmitter 21A is configured to control an alignment of the first polarised optical signal S1, for example based, at least in part, on a gravitational field such as a local gravitational field, local magnetic field and/or gyroscopic control.

In this example, the first receiver 22A is configured to receive only the set of polarised optical signals S, including the first polarised optical signal S1, by comprising a set of polarising filters, including a first polarising filter, arranged to accept, for example transmit therethrough, the set of polarised optical signals and to reject other optical signals, such as background light, having polarisations different from the transmitted set of polarised optical signals.

In this example, the controller of the first receiver 22A is configured to control the first receiver 22A to receive the first polarised optical signal S1 according to a type of polarisation of the first polarised optical signal.

In this example, the controller of the first receiver 22A is configured to control the first receiver 22A to receive the first polarised optical signal S1 according to an angle of polarisation of the first polarised optical signal S1.

In this example, the liquid medium LM is sea water.

In this example, a wavelength of the first polarised optical signal is in a range from 500 nm to 565 nm (i.e. green).

FIG. 7 schematically depicts a network, or part thereof for example a link, 3 according to an exemplary embodiment.

The network 3 is for data communication through a medium, preferably wherein the medium comprises and/or is, at least in part, a liquid medium LM. The network 3 comprises a set of transmitters 31, including a first transmitter 31A comprising a controller 310A (not shown), wherein the first transmitter 31A is configured to transmit a set of polarised optical signals S, including a first polarised optical signal S1 comprising first data D1 of set of data D. The network 3 comprises a set of receivers 32, including a first receiver 32A comprising a controller 320A (not shown), wherein the first receiver 32A is configured to receive the first polarised optical signal S1.

In this example, the first transmitter 31A comprises a light source 312A, such as a laser or LED, optics 313A for collimation of light from the light source 312A, a linear polariser 314A, such as a prism, for linear-polarisation of the collimated light and a quarter wave plate 315A. The linear polariser 314A and the quarter wave plate 315A provide a circular polariser.

In this example, the first receiver 32A comprises a quarter wave plate 325A, a linear polariser 324A, such as a prism, for receiving the first polarised optical signal S1, optics 323A for focusing the received first polarised optical signal S1 and a detector 322A, such as a Si PM, for detecting the focused received first polarised optical signal. The quarter wave plate 325A and the linear polariser 324A provide a circular polarisation filter.

In one example, the controller of the first transmitter 31A is configured to control a type of polarisation of the first polarised optical signal S1, particularly circular polarisation.

In this example, the first polarised optical signal S1 comprises is a circularly-polarised optical signal.

In this example, the first receiver 32A is configured to receive only the set of polarised optical signals, including the first polarised optical signal S1, by comprising a set of polarising filters, including a first polarising filter, arranged to accept, for example transmit therethrough, the set of polarised optical signals and to reject other optical signals, such as background light, having polarisations different from the transmitted set of polarised optical signals.

In this example, the controller of the first receiver 32A is configured to control the first receiver 32A to receive the first polarised optical signal S1 according to a type of polarisation of the first polarised optical signal S1.

In this example, the liquid medium LM is sea water.

In this example, a wavelength of the first polarised optical signal S1 is in a range from 500 nm to 565 nm (i.e. green).

FIG. 8 schematically depicts a method according to an exemplary embodiment.

Particularly, the method is of communication of data through a medium, preferably wherein the medium comprises and/or is, at least in part, a liquid medium.

At S901, a set of polarised optical signals, including a first polarised optical signal comprising first data of set of data, is transmitted by a first transmitter included in a set of transmitters. At S902, the first polarised optical signal is received by a first receiver included in a set of receivers.

The method may include any of the steps described herein.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A network for data communication through a a liquid medium, wherein the network comprises:
a set of one or more transmitters, including a transmitter comprising a light emitting diode (LED) light source configured to emit optical signals, a polariser configured to polarise the optical signals to produce a set of one or more polarised optical signals, and a controller to control the polariser, wherein the transmitter is configured to transmit the set of polarised optical signals through the liquid medium, the set of polarised optical signals including the first polarised optical signal comprising first data of a set of data and a second polarised signal comprising second data of the set of data, the second data being different than the first data, wherein polarisation of the first polarised optical signal and the second polarised optical signal are different, wherein the controller of the transmitter configured to control an alignment of the first and second polarised optical signals, and wherein the liquid medium is sea water; and
a set of one or more receivers, including a receiver comprising a controller, wherein the receiver is configured to receive the first polarised optical signal, and the controller of the receiver is configured to control a dithering angle of the first polarised optical signal according to alignment of the receiver with respect to the first polarised optical signal;
wherein the transmitter is a submersible transmitter and/or wherein the receiver is a submersible receiver; and
wherein the first polarised optical signal is a linearly-polarised optical signal.

2. The network according to claim 1, wherein the controller of the transmitter is configured to control a type of polarisation of the first and second polarised optical signals.

3. The network according to claim 1, wherein the controller of the transmitter is configured to control the alignment of the first and second polarised optical signals according to angles of the first and second polarised optical signals, respectively, relative to a surface of the liquid medium.

4. The network according to claim 1, wherein the controller of the transmitter is configured to control angles of polarisation of the first and second polarised optical signals, respectively.

5. The network according to claim 1, wherein the controller of the receiver is configured to control the receiver to receive the first polarised optical signal based on a type of polarisation of the first polarised optical signal relative to the second polarised optical signal.

6. The network according to claim 1, wherein the controller of the receiver is configured to control the receiver to receive the first polarised optical signal according to an angle of polarisation of the first polarised optical signal.

7. The network according to claim 1, wherein a wavelength of at least one of the first polarised optical signal or the second polarised optical signal is in a range from 380 nm to 740 nm.

8. The network according to claim 1, wherein the receiver is a first receiver configured to receive the first polarised optical signal, and the set of one or more receivers includes a second receiver configured to receive the second polarised optical signal.

9. The network according to claim 1, wherein the controller of the transmitter is configured to control an orientation of polarisation of the first polarised optical signal and the second polarised optical signal.

10. The network according to claim 1, wherein:
the set of one or more transmitters includes two or more transmitters, and the transmitter is a first transmitter;
the set of one or more receivers includes two or more receivers, and the receiver is a first receiver; and
the two or more receivers includes a second receiver configured to receive the second polarised optical signal.

11. The network according to claim 1, wherein the controller of the receiver is configured to control an orientation of a polarising filter.

12. The network according to claim 1, wherein to control the dithering angle of the first polarised optical signal, the controller of the receiver is configured to adjust a center of a dither of the first polarised optical signal based on comparing the first polarised optical signal received on either side of the dither.

13. A network for data communication through a liquid medium that includes sea water, the network comprising:
a set of one or more submersible transmitters, including a submersible transmitter comprising a light source configured to emit optical signals, a polariser configured to polarise the optical signals to produce a set of one or more polarised optical signals, and a controller to control the polarizer, wherein the first submersible transmitter is configured to transmit a set of one or more polarised optical signals through the liquid medium, the set of one or more polarised optical signals including a the first polarised optical signal comprising first data of a set of data and a second polarised optical signal comprising second data of the set of data, the second data being different from the first data, wherein polarisation of the first and second polarised optical signals are different, wherein the light source is a light emitting diode (LED), and wherein the controller of the submersible transmitter is configured to control an alignment of the first and second polarised optical signals based, at least in part, on a gravitational field and/or gyroscopic control; and
a set of one or more receivers, including a receiver comprising a controller, wherein the receiver is configured to receive the first polarised optical signal, wherein the controller of the receiver is configured to control a dithering of the first polarised optical signal according to alignment of the receiver with respect to the first polarised optical signal, and wherein the first polarised optical signal is a linearly-polarised optical signal.

14. The network according to claim 13, wherein the receiver is a submersible receiver.

15. The network according to claim 13, wherein the receiver is a first receiver configured to receive the first polarised optical signal, and the set of one or more receivers includes a second receiver configured to receive the second polarised optical signal.

16. The network according to claim 13, wherein to control the dithering angle of the first polarised optical signal, the controller of the receiver is configured to adjust a center of a dither of the first polarised optical signal based on comparing the first polarised optical signal received on either side of the dither.

17. A method of communication of data through a liquid medium, wherein the method comprises:
   producing, using at least one light emitting diode, a set of one of more polarised optical signals;
   transmitting through the liquid medium, by a transmitter included in a set of one or more transmitters, the set of one or more polarised optical signals, including a first polarised optical signal comprising first data of a set of data and a second polarised optical signal comprising second data of the set of data, the second data being different from the first data, wherein polarization of the first polarised optical signal and the second polarised optical signal are different, wherein the first polarised optical signal is a linearly-polarised optical signal, and wherein the liquid medium is sea water;
   controlling, with a controller of the transmitter, an alignment of the first polarised optical signal;
   receiving, by a receiver included in a set of one or more receivers, the first polarised optical signal; and
   controlling, with a controller of the receiver, a dithering angle of the first polarised optical signal according to alignment of the receiver with respect to the first polarised optical signal;
   wherein the transmitter is a submersible transmitter disposed below a surface of the sea water and/or wherein the receiver is a submersible receiver disposed below the surface of the sea water.

18. The method according to claim 17, comprising controlling, by the transmitter, a type of polarisation of the first and second polarised optical signals and/or an angle of polarisation of the first and second polarised optical signals.

19. The method of claim 17, wherein the transmitter is the submersible transmitter, and wherein transmitting the set of one or more polarised optical signals includes transmitting the set of one or more polarised optical signals using the submersible transmitter disposed below the surface of the sea water.

20. The method of claim 19, wherein the receiver is the submersible receiver, and wherein receiving the first polarised optical signal and/or the second polarised optical signal includes receiving the first polarised optical signal and/or the second polarised optical signal with the submersible receiver disposed below the surface of the sea water.

21. The method according to claim 17, wherein controlling the dithering angle of the first polarised signal includes:
   comparing the first polarised optical signal on either side of a dither of the first polarised optical signal; and
   adjusting a center of the dither based on the comparing.

* * * * *

UNITED STATES PATENT AND TRADEMARK OFFICE
CERTIFICATE OF CORRECTION

Page 1 of 1

PATENT NO. : 12,375,185 B2
APPLICATION NO. : 17/754583
DATED : July 29, 2025
INVENTOR(S) : Mark Edgar Bray et al.

It is certified that error appears in the above-identified patent and that said Letters Patent is hereby corrected as shown below:

In the Claims

In Claim 1, Column 15, Line 10, delete duplicate "a".

Signed and Sealed this
Fourteenth Day of October, 2025

John A. Squires
*Director of the United States Patent and Trademark Office*